United States Patent
DiGiovanni et al.

(10) Patent No.: US 7,546,268 B1
(45) Date of Patent: Jun. 9, 2009

(54) REAL ESTATE NOTE MARKET TOOLS AND TECHNIQUES

(76) Inventors: Angela DiGiovanni, 51 W. Center St., Ste. 430, Orem, UT (US) 84057; Mark Kemp, 51 W. Central St., #450, Orem, UT (US) 84057

( * ) Notice: Subject to any disclaimer, the term of this patent is extended or adjusted under 35 U.S.C. 154(b) by 375 days.

(21) Appl. No.: 11/344,056

(22) Filed: Jan. 31, 2006

Related U.S. Application Data (60) Provisional application No. 60/649,321, filed on Feb. 1, 2005.

(51) Int. Cl.
 *G06Q 40/00* (2006.01)
(52) U.S. Cl. .................... 705/37; 705/35; 705/36 R; 705/38
(58) Field of Classification Search ............... 705/35, 705/36 R, 37, 38
See application file for complete search history.

(56) References Cited

U.S. PATENT DOCUMENTS

| | | | |
|---|---|---|---|
| 6,493,683 | B1 | 12/2002 | David et al. |
| 6,598,026 | B1* | 7/2003 | Ojha et al. ............... 705/26 |
| 6,601,044 | B1 | 7/2003 | Wallman |
| 6,993,511 | B2 | 1/2006 | Himmelstein |
| 2002/0052827 | A1* | 5/2002 | Waelbroeck et al. ......... 705/37 |
| 2002/0082961 | A1 | 6/2002 | Abrahm et al. |
| 2003/0120574 | A1 | 6/2003 | Wallman |
| 2004/0128155 | A1* | 7/2004 | Vaidyanathan et al. ........ 705/1 |
| 2005/0197857 | A1 | 9/2005 | Avery |
| 2005/0273423 | A1* | 12/2005 | Kiai et al. ................. 705/38 |
| 2006/0004646 | A1 | 1/2006 | Schoen et al. |

OTHER PUBLICATIONS

U.S. Appl. No. 60/573,130.*
Carving Up Investor Risk Nicholas Yulico. National Real Estate Investor. Atlanta: Sep. 2004. vol. 46, Iss. 9; p. 29, 6 pgs.*
REITs To the Rescue? Troubled Developers Form Real Estate Investment Trusts To Raise Cash From Public; Risk Seen for Share Buyers; Kirstin Downey Grimsley. The Washington Post (pre-1997 Fulltext). Washington, D.C.: May 10, 1993. p. F.01.*
Quarterly Mutual Funds Review; Money Pours Into Stock Funds Despite Weaker Returns; As Havens, Real Estate Leads Equities Category And Treasurys Top Bonds Ian McDonald. Wall Street Journal. (Eastern edition). New York, N.Y.: Apr. 5, 2004. p. R.3.*

(Continued)

*Primary Examiner*—Lalita M Hamilton
(74) *Attorney, Agent, or Firm*—Ogilvie Law Firm (57) ABSTRACT

Tools and techniques facilitating transactions in real estate and other notes are described. Nonperforming notes and subperforming notes, for example, are described and managed in consistent ways despite differing origins. A single point of contact can be specified for each seller to avoid confusion and miscommunication. Investor performance and other behavior can be tracked and reported in an online marketplace. Investors can be automatically or partially automatically prequalified as a condition of participation in some or all aspects of the online marketplace. Bids can be automatically ranked according to how well they match a seller's criteria, and notes can be automatically ranked according to how well they match a buyer's criteria. Encryption, authentication and other security measures can be used throughout the system and its activities to maintain confidentiality of the information that is provided by sellers, by buyers, or by modules of the system.

23 Claims, 3 Drawing Sheets

OTHER PUBLICATIONS

Pages from www.friendly-note-buyers.com, no later than Jan. 28, 2006.
Behle, "How to Finance Paper", www.reiclub.com, copyright 2002-2004.
"Triple DES", en.wikipedia.org, Jan. 21, 2006.
"Advanced Encryption Standard . . . ", csrc.nist.gov, Apr. 12, 2002.
Pages from www.domania.com, copyright 1998-2004.
Pages from www.tdmarket.com, no later than Jan. 12, 2005.
Pages from notenetwork.com, copyright 1995-2004.
Posting from www.papersourceonline.com, Feb. 25, 1998
Posting from www.creonline.com, Oct. 1, 2004.
Pages from www.hannafordacq.com, Jan. 12, 2005.
Pages from www.hanovertrade.com, copyright 2003.
Postings from www.thercreativeinvestor.com, Jan. 6, 2004 to Jan. 8, 2004.
Pages from www.debtx.com, copyright 2000-2004.
Pages from www.nbdc.net, no later than Jan. 12, 2005.
Pages from www.papersourceonline.com, no later than Jan. 12, 2005.

* cited by examiner

REAL ESTATE NOTE MARKET TOOLS AND TECHNIQUES

RELATED APPLICATIONS

This application incorporates all material in, and claims priority to, U.S. provisional patent application Ser. No. 60/649,321 filed Feb. 1, 2005.

BACKGROUND

A note is a written promise to repay a certain sum of money on specified terms. Some notes are secured by collateral, meaning that if payment is not made as promised the collateral is given to the note's owner in place of the payment. In particular, some notes are secured by real estate collateral, that is to say, by ownership of rights in homes, business property, or other real estate. Some examples of such notes include mortgages, deeds of trust, and land contracts.

Notes are often bought and sold. Note buyers and sellers make contact in a variety of ways, including informal personal networks, advertisements in newspapers, and websites. However, many such contacts and resulting transactions are ad hoc. For instance, different potential buyers may be presented with very different information about the same note, and at different times. A given seller may present a given potential buyer with different types of information about notes in different transactions, even though the same seller and the same buyer—and perhaps even the same kind of note—are involved in each transaction. Sometimes buyers make bids and never hear back from a seller at all. Sometimes a potential buyer does not know which person to contact at a selling institution with a request for notes to bid on, because the seller has multiple contact points, e.g., various personnel in a bank foreclosure department, loss mitigation department, recovery department, and bankruptcy department may each have notes to sell. Often a potential buyer is financially qualified to bid on a note, but does not know that the note is being offered because the offer was made only to buyers already personally known to the seller's representative. Sometimes a buyer (or a seller) has no independent way to assess the financial capability, past performance, or other characteristics of a potential seller (or buyer).

Placing advertisements online helps address some of these issues, such as by making the availability of notes more widely known. However, other problematic issues remain, despite the presence of many websites that discuss note brokering and/or that allow or solicit descriptions of notes being offered for sale.

Other aspects of notes, transactions, and technology may also be helpful in understanding the present invention. These will be apparent to those of skill in the art, from their background and/or from the references submitted in connection with the present document.

SUMMARY

The present invention provides tools and techniques for facilitating transactions in real estate notes. One method includes obtaining, within an online marketplace system, at least one multi-field digital market participant profile including transactional criteria of a market participant (note buyer or note seller); obtaining within the online marketplace system at least one multi-field digital transaction component summary including characteristics of a transaction component (note, note bid, property); and determining to what extent the market participant transactional criteria and the transaction component summary characteristics are compatible by automatically comparing them. For instance, the method may automatically filter high-risk real estate note summaries to find ones that satisfy an investor's buying criteria, and/or automatically filter high-risk real estate note bid summaries to find ones that satisfy a bank or other seller's selling criteria. Compared items may also be automatically ranked according to how well they match the desired transactional criteria. In some embodiments, high-ranked bids are locked in, and if an investor of a given locked-in bid declines to purchase the note then the investor having the next-highest locked-in bid automatically wins the right to purchase it at the lower bid price. In some embodiments, investors are prequalified before they are allowed to bid. In some, investor behavior is tracked, and the investor's allowed participation in the online marketplace is automatically adjusted in response to the tracking results.

In addition to methods, the present invention may be embodied in systems, computer-readable storage media configured to perform methods, products produced by methods, signals, and other embodiments. In particular, in some embodiments a system for facilitating online transactions in high-risk notes includes at least one computer 606, 612 having at least one processor (computer CPU, network node, etc.) operably connected with a memory (RAM, hard disk, etc.) as supporting means of the system; at least one multi-field digital market participant profile including transactional criteria of a market participant; at least one multi-field digital transaction component summary including characteristics of a transaction component; a comparison means for automatically comparing the market participant transactional criteria and the transaction component summary characteristics; and a security means (e.g., authentication software and/or encryption software) for controlling access to the market participant profile and the transaction component summary. Some systems include a ranking means for automatically ranking a plurality of multi-field digital transaction component summaries according to how well their respective characteristics match the transactional criteria of the market participant. Some include a prequalification means for prequalifying an investor for a specified level of permissible online marketplace activity. Some include an investor behavior tracking means for tracking an investor's performance and/or other behavior. Some require sellers to respond to some, to most, or to every bid made on the seller's notes, and warn sellers who fail to respond to bids.

These examples are merely illustrative. The present invention is defined by the claims, and to the extent this summary and/or incorporated material from a parent priority document conflicts with the claims, the claims should prevail.

DRAWINGS

To illustrate the manner in which the advantages and features of the invention are obtained, a description of the present invention is given with reference to the attached drawings. These drawings only illustrate selected aspects of the invention and thus do not fully determine the invention's scope.

DETAILED DESCRIPTION

Introduction

The present invention provides tools and techniques which may help provide greater opportunity and more consistency in transactions between buyers and sellers of real estate notes. The invention is illustrated in text and drawings by specific examples, but it will be appreciated that other embodiments of the invention may depart from these examples. For instance, specific features of an example may be omitted, renamed, grouped differently, repeated, instantiated in hardware and/or software differently, performed in a different order, and/or be a mix of features appearing in two or more of the examples.

Definitions of terms are provided explicitly and implicitly throughout this document. Terms do not necessarily have the same meaning here that they have in general usage, in the usage of a particular industry, or in a particular dictionary or set of dictionaries. The inventors assert and exercise their right to their own lexicography.

In particular, as used herein the term "note" refers to an obligation secured by rights in real estate. The invention provides tools and techniques for creating, managing, and operating a marketplace in real estate instruments. For example, the invention may be used to facilitate a marketplace in home mortgage, deed of trust, or land contract loan notes and/or in other notes secured by real estate, particularly those which are nonperforming and/or subperforming. Such nonperforming and/or subperforming notes are herein termed "high-risk notes".

Although the invention may be embodied using software, and the term "software" is used herein when describing exemplary embodiments, the invention is not necessarily limited to software. Embodiments of the invention may also be described using terms such as "platform", "exchange", "marketplace", and/or "database". Embodiments also include services provided through or using such items, and particularly but without limitation services provided using computer hardware and software platforms to provide investors and sellers with a market platform in which they can exchange notes 610 and payments 124 using protocols that help limit misbehavior and track activity in a database.

Methods

Figure 1:
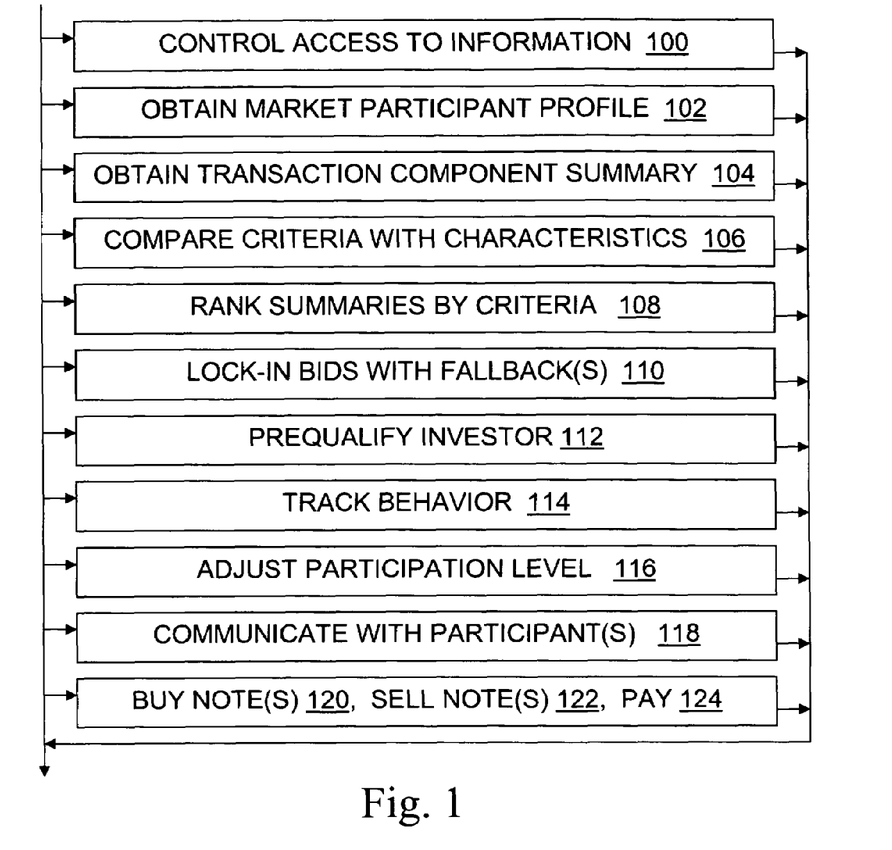
FIG. 1 is a flowchart illustrating methods of the present invention.

FIG. 1 illustrates some methods of the present invention. During an access controlling step 100, measures are taken to control access to information such as notes, bids, contacts, and the like. Suitable measures 100, 632 to implement include, among others, passwords, encryption with digital certificates, key cards, biometric tests, and other security measures, as well as file system access controls, and measures for administrators such as logging activities.

During a profile obtaining step 102, information about a market participant (seller, buyer) is obtained through a graphical user interface (GUI), webform, optical character recognition and parsing of a paper form, email, manual data entry, and/or other means for entering data into an automated system for operations on multiple pieces of data about the participant. For instance, the method may obtain 102, within an online marketplace system for transactions in high-risk real estate notes, at least one multi-field digital market participant profile including transactional criteria of a market participant. In such a case, a mere paper description of a participant's preferences or requirements does not suffice, nor does a scanned (e.g., PDF file) version of a paper description, because the profile is a "multi-field digital" profile such as a database record, XML structure, C struct, collection of individual related variables in some other programming language, or the like. Paper is analog, not digital. Scanned paper in a PDF file is digital, but is not itself multi-field in the sense intended here, although individual fields such as name, contact address, and criteria 618 might be extracted from it to create a multi-field digital profile. Separate field values are used, for example, in comparing 106 criteria of a buyer or seller with characteristics of a note or bid. Transactional criteria such as loan amount, prequalification status, and many others, are discussed further below.

Figure 2:
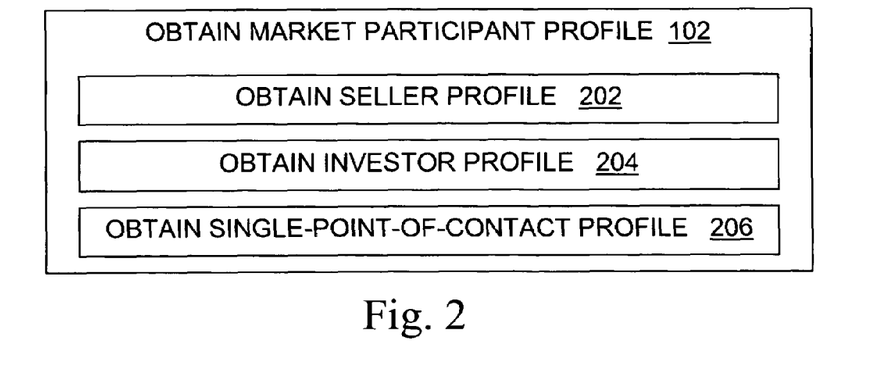
FIG. 2 shows additional detail regarding a profile-obtaining step of FIG. 1.

Information to fill a template seller profile may be obtained 202 in some instances, and information to fill a template buyer profile may be obtained 204 in other instances. In either case, multiple contacts may be allowed, unless the step 102 is tailored to obtain 206 a single contact person for a given market participant 602 or 604. For example, if a system 612 obtains at least two high-risk real estate notes from a given financial institution 604, the method may obtain 206 a single-point-of-contact for communications with that financial institution, such as the name and phone number of a person in the loss mitigation department of the institution.

Figure 3:
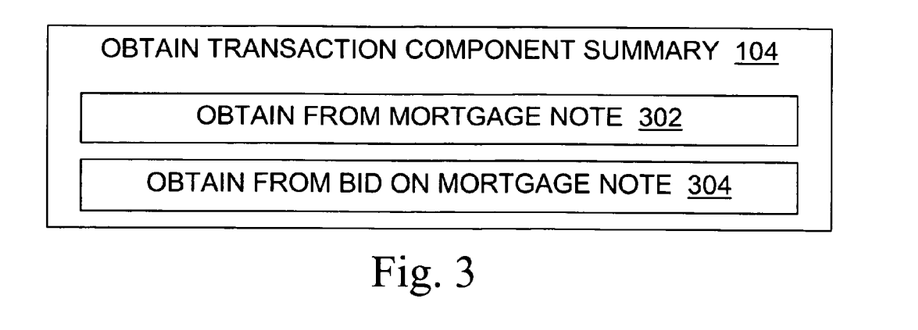
FIG. 3 shows additional detail regarding a component-obtaining step of FIG. 1.

During a component obtaining step 104, the online marketplace system obtains at least one multi-field digital transaction component summary including characteristics of a transaction component. Information to fill a template mortgage note or other real estate note may be obtained 302 in some instances, and information to fill a template bid on such a note may be obtained 304 in other instances, using a GUI or other means noted above for step 102.

During a comparing step 106, software 626 automatically compares market participant transactional criteria and transaction component summary characteristics to determine whether they are compatible, and in some embodiments, the extent to which they are compatible. Such comparison may involve string-matching, checking numeric values against other numeric values or vale ranges, checking for the presence or absence of bit-values or enumeration values, and other computational comparisons, guided by logic and algorithms to provide tangible, concrete, and useful results corresponding to real-world phenomena as discussed herein.

Figure 4:
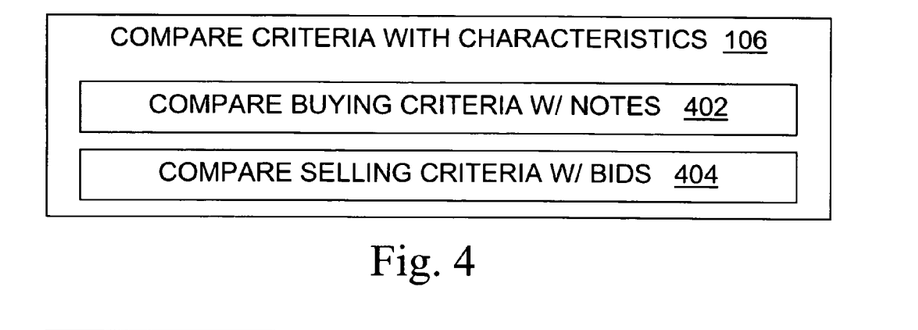
FIG. 4 shows additional detail regarding a criteria-comparing step of FIG. 1.

For example, in some embodiments, the market participant is an investor 602, the transactional criteria obtained 202 are buying criteria, the transaction component summarized 302 is a high-risk real estate note, and the method automatically filters 402 a plurality of high-risk real estate note summaries in an attempt to find at least one high-risk real estate note that satisfies the investor's buying criteria. In some embodiments, the market participant is a seller 604, the transactional criteria obtained 204 are selling criteria, the transaction component summarized 304 is a bid on a high-risk real estate note, and the method automatically filters 404 a plurality of high-risk real estate note bid summaries in an attempt to find at least one high-risk real estate note bid that satisfies the seller's selling criteria. Other comparisons may also be made 106, and/or made for other types of note.

During an automated ranking step 108, some embodiments automatically rank a plurality of multi-field digital transaction component summaries according to how well their respective characteristics match the transactional criteria of the market participant. This ranking may be implemented using indexing algorithms, sorting algorithms, balanced trees and/or other linked or arrayed data structures, and/or other familiar computational tools and techniques, to produce a tangible, useful and concrete result in the form of rankings reflecting real-world preferences and/or real-world requirements of market participants.

Figure 5:
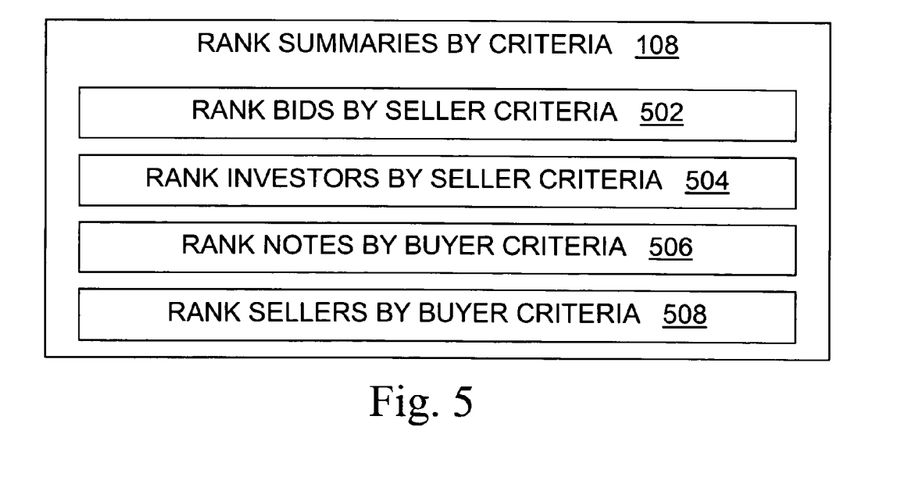
FIG. 5 shows additional detail regarding a summaries-ranking step of FIG. 1.

For example, in some embodiments, the ranking step ranks 506 high-risk real estate note summaries according to how well their respective characteristics match buying criteria of an investor. In some, the ranking step ranks 502 high-risk real estate note bid summaries according to how well their respective characteristics match selling criteria of a seller. Individual buyers may also be ranked 504 by a seller, e.g., according to their past performance, just as individual sellers may be ranked 508 by a buyer, e.g., according to whether they have been prompt in responding to bids 608 in the past.

During an automated bid management lock-in step 110 found in some embodiments, high bids can be locked-in so a seller has more than one potential winner in a given auction and a procedure is established for determining the order in which the potential winners are presented with a right of refusal to perform their bid. For example, one method obtains 304 at least two high-risk real estate note bids 620 from different investors 602, and locks in 110 at least the two highest bids. Then, if an investor of a given locked-in bid declines to purchase the high-risk real estate note, the method specifies that the investor having the next-highest locked-in bid automatically wins a right to purchase the high-risk real estate note at a price given in that next-highest locked-in bid.

During a partially or fully automated prequalifying step 112, some methods obtain at least part of a multi-field digital market participant profile of an investor, and then process that data by comparing it to acceptable values to determine whether to prequalify the investor. If the investor meets the minimal requirements for participation at a particular level in the market, then the system 612 automatically increases 116 the extent to which the online marketplace system accepts bids from the prequalified investor. For instance, the prequalified investor may have his/her/its participation level adjusted upward 116 to be allowed in to place bids; to be allowed in and allowed to place bids only up to a maximum value, and/or to be allowed to place bids on properties of a particular seller or group of sellers. Software 632, 636 enforces the limitations on investor participation, e.g., by refusing to accept certain bids and/or by not presenting 118 certain notes to the investor.

During a partially or fully automated tracking step 114, an investor's behavior is monitored. This may be implemented by keeping a log on disk 614 of investor activity in the system 612, and/or by soliciting feedback from other market participants or regulators 652, for example. The investor's allowed participation in the online marketplace may be automatically adjusted 116 in response to a result of the tracking step, either to reward desired behavior or to discourage undesired behavior.

Systems

Figure 6:
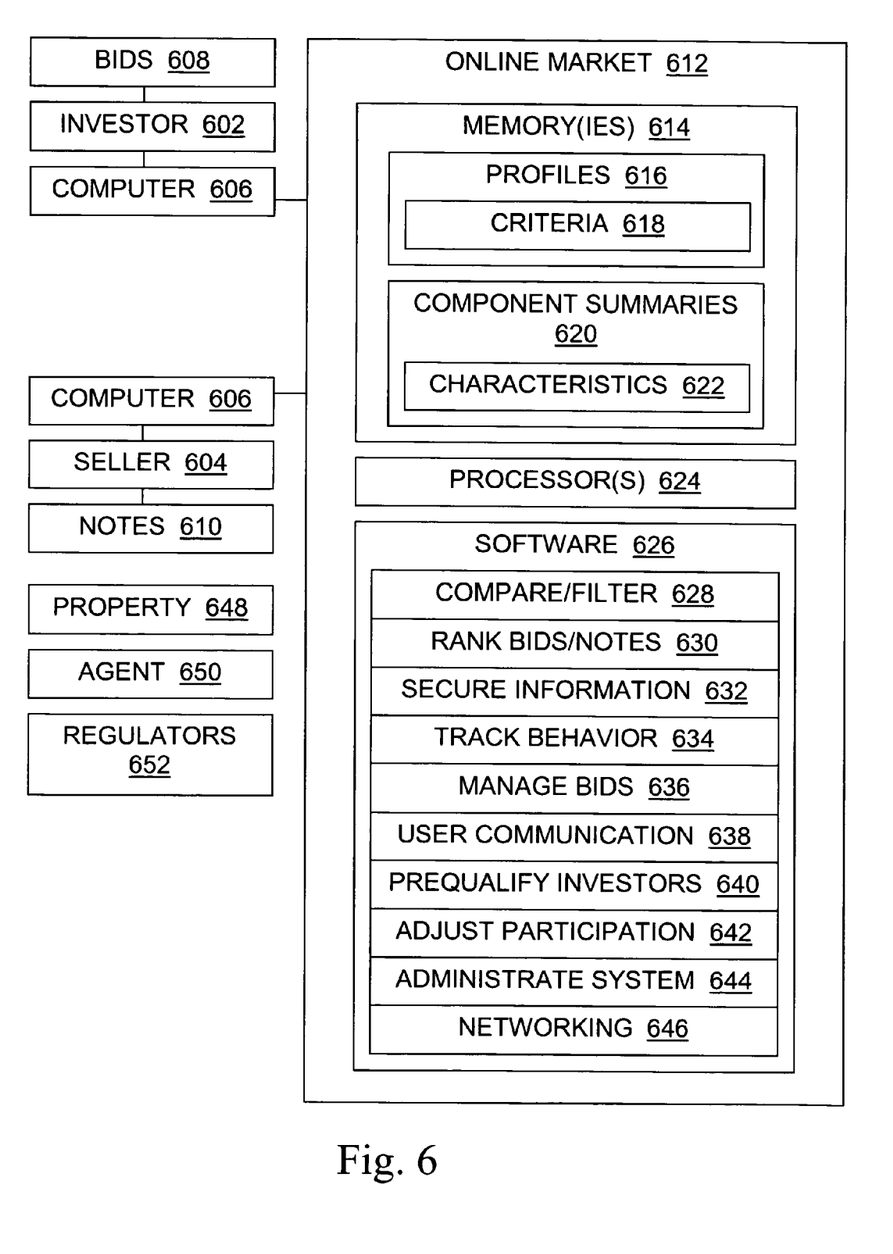
FIG. 6 is a block diagram illustrating systems and data structures of the present invention, in a usage context showing roles such as investor and seller.

Turning the main focus now to FIG. 6, in some embodiments the invention includes a web-based or other networked market platform 612, which may be used to help create market discipline, manage moral hazard, and provide other benefits. Familiar web-related and other networking technologies 646 may be used, including without limitation servers, clients, peers, network protocols and languages (HTTPS, XML, TCP/IP, VPNs, scripts, DNS, wireless protocols, and so on), computer hardware 606, 624, 614, computer software 626, digital signatures, encryption, authentication, databases, GUIs, and so on. They may be used in the Internet, local networks, individual workstations, PDAs, cell phones, or other computing devices 606, and/or in other conventional nodes or collections of nodes. Such general purpose and familiar technologies provide functional means when modified by special purpose software and/or data 626 to perform as described herein.

One system 612 for facilitating online transactions in high-risk notes includes a processor 624 operably connected with a memory 614 to support one or more means 626 of the system. At least one multi-field digital market participant profile 616, including transactional criteria 618 of a market participant, is in the system. At least one multi-field digital transaction component summary 620, including characteristics 622 of a transaction component, is in the system. A comparison means 628 for automatically comparing the market participant transactional criteria and the transaction component summary characteristics is provided. The term "means" is used in "comparison means" to include and reflect the wide range of possible software implementations and supporting hardware (expressly noted herein and/or equivalent to the same) that can be used to implement some or all of the comparison 106 functionality discussed herein.

Other means may be similarly provided, that is, they may be implemented by a wide range of software and supporting hardware to provide at least some or all of the functionality of their respective identified steps discussed herein. Thus, a security means 632 may be similarly provided for controlling 100 access to the market participant profile and the transaction component summary, and to other confidential information. A ranking means 630 may be similarly provided for automatically ranking 108 a plurality of multi-field digital transaction component summaries according to how well their respective characteristics match the transactional criteria of the market participant. A prequalification means 640 may be similarly provided for prequalifying 112 an investor and/or a seller for a specified level of permissible online marketplace activity. An investor and/or seller behavior tracking means 634 may be similarly provided for tracking a participant's behavior; in particular, in some embodiments the investor behavior tracking means tracks the investor's performance after the investor wins a bid.

In one embodiment, the system 612 includes a plurality of multi-field digital transaction component summaries 620 of high-risk real estate notes from a plurality of sellers 604, and each such summary includes substantially the same set of real estate note characteristics. Thus, notes are compared 106, ranked 108, and/or presented 118 in the marketplace in a consistent manner despite their different sources.

In one embodiment, the system 612 includes a software module 628 capable of filtering a plurality of high-risk real estate note summaries in an attempt to find at least one high-risk real estate note that satisfies an investor's buying criteria, and also includes the same or another software module 628 capable of filtering a plurality of high-risk real estate note bid summaries in an attempt to find at least one high-risk real estate note bid that satisfies a seller's selling criteria. The system may include software 634 capable of tracking an investor's behavior in a marketplace for high-risk real estate notes and limiting 642 investor participation in response to an undesired behavior, and/or capable of similar tracking and participation adjusting based on seller behavior. The system may include a software module 630 for ranking bids according to seller criteria, the same or another software module 630 for ranking investors according to seller criteria, the same or another software module 630 for ranking sellers according to buyer criteria, and/or the same or another software module 630 for ranking notes according to buyer criteria.

In some embodiments, investor buying criteria 618 recognized by the software 628 and/or 630 include some or all of the following: second mortgage status, second mortgage amount, note position, unpaid principal balance amount, length of time in default, interest rate, location of collateral, type of collateral, characteristics of collateral property, legal foreclosure or bankruptcy process status, value of collateral.

In some embodiments, seller selling criteria 618 recognized by the software 628 and/or 630 include some or all of the following: a preference for investors who have purchased another note from the seller within a specified period, a minimum opening bid, duration of auction, preparer of assignment, date assignment to be delivered, expected delivery date of funds, date remaining file is to be delivered.

In some embodiments, the tracking and limiting software 634, 642 is capable of monitoring an investor's performance in an online marketplace, and capable of performing at least one of the following in response to undesired investor activity: warning the investor; warning a seller to take extra care with the investor, changing the investor's buying criteria, requiring that the investor repeat a prequalification process, placing another limitation on the investor's permissible activity in the online marketplace, completely denying the investor access to online marketplace activities. Examples of undesired investor activity thus monitored may include, for instance: failure to wire funds on time to a seller when the investor wins an auction for a given note, transaction interference, bid retraction, an unpaid item, unwelcome buying, unwelcome bidding, shill bidding, solicitation of an off-site sale (i.e., a sale that is not tracked or conducted through the system 612). Some systems 612 include software 634, 636 that requires sellers to respond to at least most of the bids made on seller notes, and they include software 642, 638 configured to warn sellers who fail to respond at all to bids, or who fail to respond in a timely manner.

In addition to viewing the invention according to the type of embodiment one is interested in, e.g., viewing with particular attention to methods or particular attention to systems, one can also view the present invention according to the functionality it provides. That is, discussion of the invention may be organized according to one or more features that may be of particular interest in a given situation. We turn now to descriptions organized primarily by feature. It will be understood that just as different types of embodiments may share some features, given features may be implemented in various embodiments.

Investor Buying Criteria

In one aspect of some embodiments of the invention, an investor 602 (e.g., a prospective buyer of one or more high-risk notes 610) submits to the inventive system 612 an investor profile 616. The investor profile may specify the investor's preferences and/or solid requirements for buying 120 notes. Such buying criteria 618 may rule out notes on properties that are subject to a second mortgage, for instance, or may rule in such notes, or may set dollar limits or ranges on the amount of a second mortgage. Other examples of buying criteria include note position, unpaid principal balance (UPB) amount, length of time in default, interest rate, location of collateral, type of collateral (e.g., single family residence, condominium, multi-family residence, commercial), characteristics of collateral (e.g., number of bedrooms, number of bathrooms, square footage, lot size, and so on), legal process status (e.g., foreclosure, bankruptcy), value of collateral.

The inventive software 628 compares a given investor's buying criteria to the characteristics 622 of a given note, and then includes or excludes the note, depending on whether the characteristics meet the buying criteria. Notes that fail to meet the buying criteria are then not presented 118 to the investor for possible purchase, while notes that meet the buying criteria are presented. In some embodiments, however, an investor can perform searches 118 that may find notes outside of the investor's submitted buying criteria, but cannot bid on such notes.

In some alternative embodiments, notes are ranked 108 by the inventive software 630 in order of preference according to the extent to which they meet the buying criteria, and the ranked list is presented 118 to the investor. Sellers 508 may also be ranked 508 according to how well they meet buyer criteria. In either case, details as to which criteria 618 match and which fail (and why) may also be presented 118. In some embodiments, different buying criteria are weighted 108 differently. Thus, if note A meets criterion 1 and fails criterion 2, and note B fails criterion 1 and meets criterion 2, and if criterion 1 is deemed more important, then note A receives a higher ranking than note B even though each note meets only one of the two criteria.

Consistent Property/Note Characteristics

In one aspect of some embodiments of the invention, notes 610 and/or the properties 648 to which notes pertain are described and managed in the inventive system 612 using a fixed set of characteristics 622. Suitable characteristics include, for instance, the homeowner's name, payment history, lien position, status (foreclosure, bankruptcy, etc.), taxes due, collateral value, senior liens, last paid date/next due, original appraisal/last known value, date of last known value, collateral address, date of loan, original amount of loan, unpaid balance, interest rate, total past due amount/months delinquent.

These characteristics 622, or a consistent subset of them, are presented 118 to investors. Thus, notes from different banks 604 and/or from various other sources 604 (e.g., government agencies, private brokers) are made comparable (in software 628 and/or in the analyses of investors 602) because substantially the same set of facts is presented about each of them, despite the variety of sources which place them in the inventive marketplace for sale. As used herein, one set of characteristics is substantially the same as another if they overlap in at least ninety percent of the presented/operated on data fields. Given such consistency, investors may more readily determine which notes to consider for purchase 120 or further investigation, and may rank notes according to their preferences and/or requirements. A consistent set of characteristics 622 may also be used internally by the system 612 in some embodiments, e.g., in ranking 506 notes according to buying criteria as discussed above.

Selling Criteria

In one aspect of some embodiments of the invention, a seller 604 (e.g., a bank or a private broker holding one or more high-risk notes 610) submits to the inventive system 612 a seller profile 616. The seller profile may pertain to all notes submitted by the seller, to specified groups of notes, and/or to individual notes. The seller profile specifies the seller's preferences 618 and/or fixed requirements 618 for selling notes. For instance, the profile may state a preference for investors who have purchased another note from the seller within the past sixty days (by listing such sellers manually by login name and/or automatically by tracking activity in the web-based marketplace). As another example, the profile may state a minimum opening bid for a given note. Other examples of selling criteria 618 include duration of auction, preparer of assignment, date assignment to be delivered, expected delivery date of funds, and date remaining file is to be delivered.

The inventive software 628 compares a given investor's credentials 616 and/or bid 620 to the seller's profile 616, and then includes or excludes the bid 620 and/or the investor 602, depending on whether the credentials and/or bid meet the selling criteria 618. This may also be done with multiple investors 602. If the selling criteria are not met, steps taken by or in conjunction with bid management software 636 may include: not displaying 118 the note's availability to the investor(s), displaying 118 the unsatisfied criteria and giving the investor(s) a chance to cure so criteria are met, refusing 118 to accept a bid on the note from the investor(s), deleting the note from the database of the investor(s) available notes to bid on, for instance.

In some alternative embodiments, investors are ranked 504 for the seller and/or bids are ranked 502 for the seller by the software 630 in order of preference according to the extent to which they meet the selling criteria. The ranked list is presented 118 to the bank 604 or other note seller 604. Details as to which criteria match and which fail (and why) may also be presented 118. In some embodiments, different selling criteria are weighted 108 differently.

Investor Prequalification

In one aspect of some embodiments of the invention, an investor undergoes a prequalification process 112 before receiving 118 from a security module 632 a login name and password (and/or other identifying and authenticating information) that permits the investor to participate in an online notes marketplace 612 of the invention. In some embodiments, different levels of prequalification success correspond 116 to different levels of permissible activity in the marketplace. For instance, when banks 604 post auctions, they may have the ability to allow/disallow 116 certain bidders 602 according to the bidder's experience level 618. To facilitate that, an investor prequalification module 640 could inquire 112 into the investor's previous note buying experience. One could ask 112 prospects 602 for their buying experience, e.g., the number of notes/pools they've bought and in what dollar range.

In some embodiments, part of the prequalification process is performed online; in others all of it, or none of it, is performed online. Depending on the embodiment, prequalification 112 may include one or more of the following steps: determining the investor's credit score with a credit reporting service such as TransUnion, Experian, and/or Equifax; obtaining the investor's credit history from a credit reporting service, bank, creditors, and/or other sources; performing a background check on the investor to identify criminal records, bankruptcies, litigation, and other facts; verifying the correctness of the address (postal residential, postal employer, email), employment, and other personal information provided by the investor; obtaining proof of identity (driver's license or otherwise); obtaining credit references.

Performance Tracking

In one aspect of some embodiments of the invention, an investor's performance in the online marketplace is monitored 114 by inventive software 634, and undesired investor activity (including lack of action) results in one or more of the following steps 642 by the software: warnings 118 to the investor; warnings to sellers; changes in the investor's buying criteria 618; a requirement that the investor repeat the prequalification process 112; other limitations 116 on the investor's permissible activity in the online marketplace; complete denial 116, 118 of investor access to the online marketplace 612. Similar monitoring 114 of seller behavior, and similar adjustments 116 to limits on seller market participation, can also or alternately be part of an embodiment.

In particular, to the extent that the inventive marketplace 612 accepts notes 610 from a variety of sources 604, e.g., from multiple banks, it thus becomes possible in some embodiments for an investor's misbehavior with regard to one source of notes to automatically result in warning notices by software 638 to that source 604 and to other sources 604, and/or to loss 116 of investor opportunities with respect to some or all note sources in the marketplace. Moreover, this can be done consistently by the software 626, with all parties 602, 604 involved knowing up front what constitutes misbehavior and what will result from specified misbehavior. Behavior expectations can be set during a participant registration process 100, for example, and reminders can be presented 118 during participation in the market.

Depending on the embodiment, examples of investor misbehavior thus monitored 114 and acted 116, 118 upon may include: failure to wire funds on time to the seller when the investor wins an auction for a given note, transaction interference, bid retractions, unpaid items, unwelcome buying/bidding, shill bidding, and/or solicitation of an off-site sale, for example.

In some embodiments, the monitored investor performance pertains only to investor actions taken up to and including the point at which the investor pays 124 for a given note. In other embodiments, investor activity after that point is also monitored 114. For instance, homeowners of homes for which an investor purchased notes may be emailed 118 or otherwise contacted, and surveyed; the survey results (aggregate and/or per-note) may then be made available 118 in the inventive marketplace 612. As another example, the percentage of notes purchased by a given investor which have subsequently become performing notes may be reported 118, as may the percentage of notes purchased by the investor which have subsequently been involved in bankruptcy proceedings. Other aspects of investor activity after purchasing the note may also be tracked 114, investigated, and reported 118, to determine answers to the following questions, for example:

Did the investor get reinstated?

Did the investor offer the homeowner a forbearance or a loan modification?

Did the investor get the homeowner refinanced?

Did the investor resell 122 the note?

Did the investor help the homeowner sell collateral?

Did the investor get the deed?

Did the investor foreclose?

Single Point-of-Contact

In one aspect of some embodiments 612 or FIG. 1 of the invention, all bids 608, inquiries, payments, and other marketplace actions regarding the notes offered for sale in the inventive online marketplace from a given source (e.g., a given bank) 604 are directed 118 by software 638 to a single authorized representative of that source. That is, the source contact is specified 100 on an all-notes basis. In some alternative embodiments, the source contact is specified 100 on a note-by-note basis, and in others, notes are grouped 100 and the source contact is specified for all notes in a given group.

In some embodiments, multiple source contacts are specified, ranked 108 in order of decreasing preference and subject to stated criteria 618 for trying one contact before moving on to the next. In some embodiments, contact may be made 118 by automatically-generated email, and/or by other communications created by the software 638/630/644, e.g., by automatically generated phone calls or faxes. In some embodiments, investor contacts are similarly managed 100, e.g., an investor could identify an authorized agent 650 to be contacted by the marketplace software 638 in the event the investor 602 cannot be reached.

By monitoring 114 and limiting 116 actions in the online marketplace 612, some embodiments of the invention can avoid situations in which several people in a given bank 604 take inconsistent action with respect to a particular note 610. For instance, a properly implemented and configured online marketplace of the invention could avoid this scenario: person A at a given bank tells investor 1 on the phone that the note in question can be bought for $20,000, while at about the same time person B at the bank faxes investor 1 a statement that the same note can be bought for $30,000, and at about the same time person C at the bank tells investor 2 that the same note can be bought for $15,000. Other scenarios of inconsistent treatment of a note can similarly be avoided, by using a single person from the bank as the single point of contact in the bank's unique system profile 616, by tracking and prioritizing actions online by investors, and/or by software 636 for detecting and resolving potentially inconsistent actions, using rule-based software, user action protocols, and/or by other action-limiting software 642. For example, with a single contact, whichever of investor 1 and investor 2 bids 304 first on the note (or whichever has a bid first accepted by the single contact), would win the auction.

Ranked Offers

In one aspect of some embodiments of the invention, offers 620 to buy a given note (or a given bundled set of notes 620) are automatically ranked 108 by the inventive software 630 before being presented 118 by the inventive system 612 to the seller 604. Ranking may be according to the price bid, according to the investor's past history (e.g., good record of performance in the marketplace created by wiring 124 payments to sellers on time in past transactions), and/or according to other criteria 618. In some embodiments, bids can be automatically resorted 108 according to different criteria, e.g., the default may be to rank offers in order of decreasing price but the seller may be able to have the software 630 dynamically re-order the offers according to the number of recent transactions fully performed by the investor.

In some embodiments, the first three bids on a given note are locked in 110 by the software 636, and if the first investor declines to actually purchase 120 the note, the second-listed investor automatically wins 110 the right to purchase the note at the lower bid made by that second investor. If the second investor then declines, the third investor automatically wins 110 the right to purchase at the even lower bid made by that third investor. In some embodiments more than three bids are thus locked in 110 with fallback. In other embodiments, there is no third investor, but there may still be a second investor as a fallback in case the initially winning investor fails to perform. In still other embodiments, there is no such simultaneous second investor as a fallback; if the winning bid is not performed, then the software 636 returns the note to open bidding in the marketplace, or the note is withdrawn, as the seller sees fit.

Some embodiments of the invention require responses from sellers instead of making responses optional. This may be done by warning 118 sellers who fail to respond to bids, and by eventually barring 116 them from the inventive online marketplace if they fail to heed the warning(s). Sellers may be contractually obligated 100 to sell 122 their marketed notes to the highest bidder who meets the selling criteria, as a condition of placing 302 notes for sale in the inventive marketplace 612. Some embodiments 636 can avoid situations in which a bid is made 304 and never responded to, for instance, either because the investor making the bid is not personally known to the seller, or because a higher bid has already been received by the seller.

Additional Observations

The automated nature of the inventive online marketplace 612 can make a qualitative difference in market behavior. Steps presently avoided as too labor-intensive and/or too subjective can be automated, and hence performed more efficiently and with greater consistency across investors, across notes, and/or across sellers.

In some embodiments, given notes are offered for sale only through the inventive online marketplace 612; they are not simultaneously offered through conventional channels. This exclusive listing of notes can be made into a contractual obligation to which the seller agrees 100, either as a condition for registering 102 with the inventive marketplace or as a condition for listing 104 a specific note in the inventive marketplace.

In some embodiments, the online marketplace serves to inform 118 investors and sellers, and to facilitate and document transactions, but does not provide any escrow services. In some, it provides no payment 124 escrow service that is routinely used in at least half of the transactions; in some it provides no escrow used in at least five percent of transactions and/or by at least five percent of buyers or five percent of sellers. These cutoffs may vary. An object of the cutoffs is to prevent avoidance of literal infringement of a claim to an embodiment having no escrow capability by simply adding an escrow feature that is rarely if ever used in practice. That is, merely adding an unused escrow feature does not necessarily remove a system from the scope of the invention.

A market platform according to some embodiments of the invention will tend to yield the highest price for the sellers' notes, as the market so dictates. Such a platform will offer buyers a place to come and have equal buying opportunities, e.g., by reducing their risk of being unfairly "black-balled", by providing means 634, 638 by which they may be judged based more, or only, on their performance.

Security Considerations

Those of skill in the art will appreciate that the information and activities discussed above may be implemented using familiar or future-developed tools and techniques to enhance security. In particular, and without excluding other security-enhancing approaches, authentication and other access-control tools can be used in modules 632 (and/or one or more of modules 634, 638, 640, 642, 644, 646, for example) of the present invention to reduce 100 or prevent 100 unauthorized persons from accessing (i.e., reading, updating, copying, transferring, updating, and/or creating) confidential information such as profiles 616, note characteristics 622, bids 620, logs of system activity 644, or the like. Similarly, encryption can be used 100 on confidential information (financial, personal, trade secret, etc.) to protect it from undesired or improper disclosure. Digital signatures can be used 100 to detect (and if their use is publicized, to discourage) tampering with any information, confidential or otherwise, that is stored in a device or system according to the invention. Secure logs of system accesses can be maintained 100, periodically submitted by the system 644 to an authorized administrator for review, and analyzed by tools 644 for patterns indicating improper access and/or illegal activity or activity that must be reported to regulatory authorities 652. Other security measures may also be taken, including without limitation any or all of the measures that are normally taken by banks, credit unions, credit bureaus, other financial institutions, regulatory agencies, merchants, investors, or the like to secure their confidential information or the confidential information entrusted to them by others.

Without excluding the foregoing, embodiments 612 and/or FIG. 1 of the present invention may use any of the following personal identification technologies, either alone or in various combinations:

Passwords. Examples include computer passwords and pass phrases, automatic teller or debit card or telephone card personal identification numbers ("PINs"), and combinations for opening combination locks. Email addresses, zip codes, government or corporate ID numbers, and telephone numbers are sometimes also used as passwords. Passwords are relatively easy to implement and can be entered quickly and easily, using standard computer hardware and software.

Cards. Magnetic, optical, punched, "smart" (embedded circuit), or other encoded identity cards or similar portable devices can also be used quickly by authorized (or by unauthorized) users. Such cards are relatively inexpensive. They can also hold more data than a password, and they are harder to duplicate than a password. Data may be stored in magnetic strips or embedded chips in credit cards, card-key access system cards, or "smart cards"; in optically read patterns on "photo ID" cards such as driver licenses and employee badges; and in digital data structures such as logon certificates, digital certificates, digital tokens, and other data structures which serve to identify a user (a human or a computer task) to a network or other computer 606, 612 system, typically by providing the user ID and permissions in encrypted form to the system for decryption and authentication.

Biometrics. Biometrics rely on distinguishing physical patterns found on or in the human body. For example, biometric systems may include hardware and software for scanning and identifying fingerprints, retinal or iris patterns, voice patterns, faces, blood type, DNA, and other physical characteristics.

Encryption keys. Examples include symmetric and public key systems such as those built on the cryptographic techniques described in *Applied Cryptography: Protocols, Algorithms, and Source Code in C, Second Edition* by Bruce Schneier (ISBN 0-471-12845-7, John Wiley & Sons 1996), and in other works on cryptography.

Witnesses. Examples include a guard, escort, or other official who is present at the entry to a secure facility and who personally recognizes and vouches for the identity of persons that are granted access to the facility.

Without excluding the foregoing, embodiments 612 and/or FIG. 1 of the present invention may use 100, 632 any of the following encryption tools and techniques, either alone or in various combinations: Data Encryption Standard (DES), Triple Data Encryption Algorithm (TDES/TDEA/2DES/3DES), Advanced Encryption Standard (AES), Skipjack, Secure WAP, HTTPS, SSL, Bearer Independent Protocol (BIP).

CONCLUSION

The invention is illustrated above by specific examples, but it will be appreciated that other embodiments of the invention may depart from these examples. For instance, specific features of an example method or an example system may be omitted, renamed, grouped differently, repeated, instantiated in hardware and/or software differently, performed in a different order, or be a mix of features appearing in two or more of the examples.

Definitions of terms are provided explicitly and implicitly throughout this document. Terms do not necessarily have the same meaning here that they have in general usage, in the usage of a particular industry, or in a particular dictionary or set of dictionaries.

Headings are for convenience only; information on a given topic may be found outside the section whose heading indicates that topic. All claims as filed are part of the specification and thus help describe the invention, and repeated claim language may be inserted outside the claims as needed.

It is to be understood that the above-referenced embodiments are illustrative of the application for the principles of the present invention. Numerous modifications and alternative embodiments can be devised without departing from the spirit and scope of the present invention. While the present invention has been shown and described above in connection with the exemplary embodiments of the invention, it will be apparent to those of ordinary skill in the art that numerous modifications can be made without departing from the principles and concepts of the invention as set forth in the claims.

As used herein, terms such as "a" and "the" and designations such as "note" and "buying" are inclusive of one or more of the indicated item or step. In particular, in the claims a reference to an item generally means at least one such item is present and a reference to a step means at least one instance of the step is performed.

Although particular embodiments of the present invention are expressly illustrated and described herein as methods, for instance, it will be appreciated that discussion of one type of embodiment also generally extends to other embodiment types. For instance, the descriptions of methods also help describe systems. It does not follow that limitations from one embodiment are necessarily read into another.

Suitable software to assist in implementing the invention is readily provided by those of skill in the pertinent art(s) using the teachings presented here and programming languages and tools such as C++, C, Java, Pascal, scripting languages, HTML, XML, APIs, SDKs, network protocol stacks 646, assembly language, firmware, microcode, and/or other languages and tools.

When possible, claims should also be read to cover different actors. For instance, a method performed by an online marketing service corresponds to a method performed by an investor using that online note marketing service, and to a method performed by a bank or other seller using that online note marketing service.

We claim:

1. A method comprising:
    obtaining at a network node, within an online auction marketplace for high risk real estate notes, a digital profile including transactional criteria of an auction market participant; obtaining a digital summary including characteristics of a transaction component; automatically determining whether the transactional criteria and the transaction component summary characteristics are compatible; confidentially tracking auction market participant behavior; and confidentially automatically adjusting allowed participation in the online auction marketplace through a computing device in response to a result of the tracking step by at least one of: refusing a bid, not presenting a note, changing a buying criterion, requiring prequalification, denying access to online marketplace activities.

2. The method of claim 1, wherein the auction market participant is an investor, the transactional criteria are buying criteria, the transaction component is a high-risk real estate note, and the method automatically filters a plurality of high-risk real estate note summaries in an attempt to find at least one high-risk real estate note that satisfies the investor's buying criteria.

3. The method of claim 1, wherein the auction market participant is a seller, the transactional criteria are selling criteria, the transaction component is a bid on a high-risk real estate note, and the method automatically filters a plurality of high-risk real estate note bid summaries in an attempt to find at least one high-risk real estate note bid that satisfies the seller's selling criteria.

4. The method of claim 1, further comprising automatically ranking a plurality of multi-field digital transaction component summaries according to how well their respective characteristics match the transactional criteria of the auction market participant.

5. The method of claim 4, wherein the ranking step ranks high-risk real estate note summaries according to how well their respective characteristics match buying criteria of an investor.

6. The method of claim 4, wherein the ranking step ranks high-risk real estate note bid summaries according to how well their respective characteristics match selling criteria of a seller.

7. The method of claim 6, wherein the method obtains at least two high-risk real estate note bids from different investors, and the method further comprises locking in at least the two highest bids, and if an investor of a given locked-in bid declines to purchase the high-risk real estate note then the method comprises specifying that the investor having the next-highest locked-in bid automatically wins a right to purchase the high-risk real estate note at a price given in that next-highest locked-in bid.

8. The method of claim 1, wherein the method obtains at least two high-risk real estate notes from a given financial institution, and the method further comprises obtaining a single-point-of-contact for communications with that financial institution.

9. The method of claim 1, wherein the method obtains at least part of a multi-field digital auction market participant profile of an investor, and the method further comprises prequalifying the investor and then increasing the extent to which the online auction marketplace accepts bids from the prequalified investor.

10. A system, comprising:
a network node including a CPU operably connected with a memory;
the memory configured by a participant profile including transactional criteria of an auction market participant and a transaction component summary including characteristics of a transaction component;
comparison means for automatically comparing transactional criteria and transaction component summary characteristics;
tracking means for tracking a participant's behavior;
automatic means for limiting marketplace participation in response to tracked behavior; and
security means for controlling access to a log of the participant's behavior.

11. The system of claim 10, comprising a ranking means for automatically ranking a plurality of multi-field digital transaction component summaries according to how well their respective characteristics match the transactional criteria of the auction market participant.

12. The system of claim 10, further comprising a prequalification means for prequalifying an investor for a specified level of permissible online auction marketplace activity.

13. The system of claim 10, wherein the participant behavior tracking means tracks an investor's performance after the investor wins a bid.

14. The system of claim 10, wherein the system comprises a plurality of multi-field digital transaction component summaries of high-risk real estate notes from a plurality of sellers, and each such summary includes substantially the same set of real estate note characteristics, whereby notes are presented in the auction marketplace in a consistent manner despite their different sources.

15. A system of network nodes comprising:
a processor connected with a memory configured by:
software for filtering a plurality of high-risk real estate note summaries to find at least one note that satisfies an investor's buying criteria;
software for filtering a plurality of high-risk real estate note bid summaries to find at least one bid that satisfies a seller's selling criteria; and
software for confidentially fully automatically limiting participation in response to an investor's undesired behavior by at least one of: refusing a bid, not presenting a note, changing a buying criterion, requiring prequalification, denying access to online marketplace activities.

16. The system of claim 15, further comprising at least one of: software for ranking bids according to seller criteria, software for ranking investors according to seller criteria, software for ranking notes according to buyer criteria.

17. The system of claim 15, wherein the investor's buying criteria recognized by the software include at least four of the following: second mortgage status, second mortgage amount, note position, unpaid principal balance amount, length of time in default, interest rate, location of collateral, type of collateral, characteristics of collateral property, legal foreclosure or bankruptcy process status, value of collateral.

18. The system of claim 15, wherein the seller's selling criteria recognized by the software include at least three of the following: a preference for investors who have purchased another note from the seller within a specified period, a minimum opening bid, duration of auction, preparer of assignment, date assignment to be delivered, expected delivery date of funds, date remaining file is to be delivered.

19. The system of claim 15, wherein the system comprises software capable of monitoring an investor's performance in an online auction marketplace, and capable of automatically performing at least one of the following in response to undesired investor activity: warning the investor; warning a seller, changing the investor's buying criteria, requiring that the investor repeat a prequalification process, placing another limitation on the investor's permissible activity in the online marketplace, completely denying the investor access to activities within the online auction marketplace.

20. The system of claim 19, wherein examples of undesired investor activity thus monitored include at least two of the following: failure to wire funds on time to a seller when the investor wins an auction for a given note, transaction interference, bid retraction, an unpaid item, unwelcome buying, unwelcome bidding, shill bidding, solicitation of an off-site sale.

21. The system of claim 15, wherein the system requires sellers to respond to at least most of the bids made on seller notes, and the system includes software configured to warn sellers who fail to respond to bids.

22. The system of claim 15, further comprising authentication software and encryption software for controlling access to the high-risk real estate note bid summaries and the high-risk real estate note summaries.

23. The system of claim 15, wherein the system is free of payment escrow capabilities that are routinely used in at five percent of transactions.

* * * * *